July 31, 1923.  1,463,689
R. D. GRAY
PHOTO ENLARGING MACHINE
Filed March 5, 1921   2 Sheets-Sheet 1
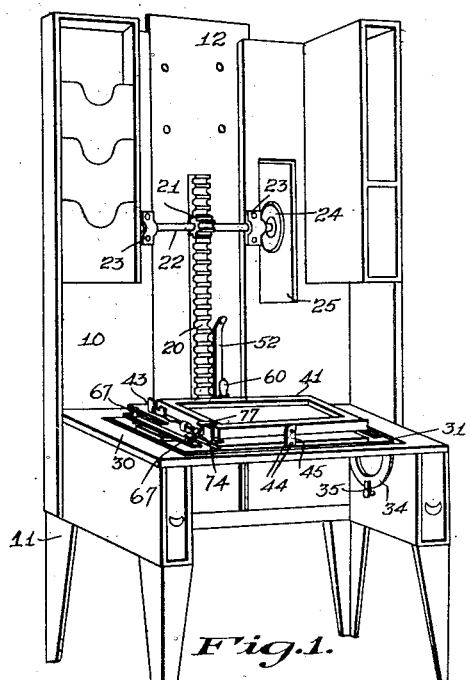
Fig.1.
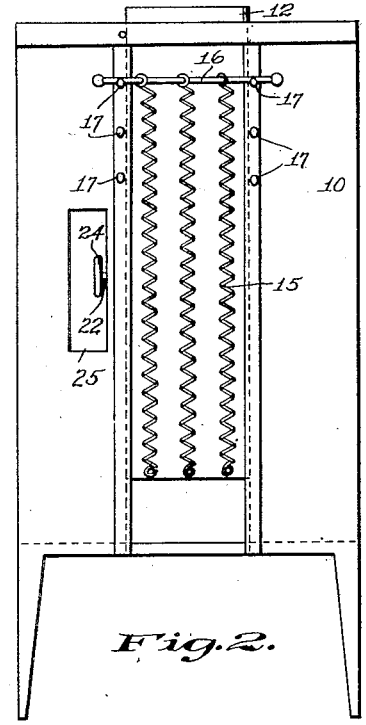
Fig.2.
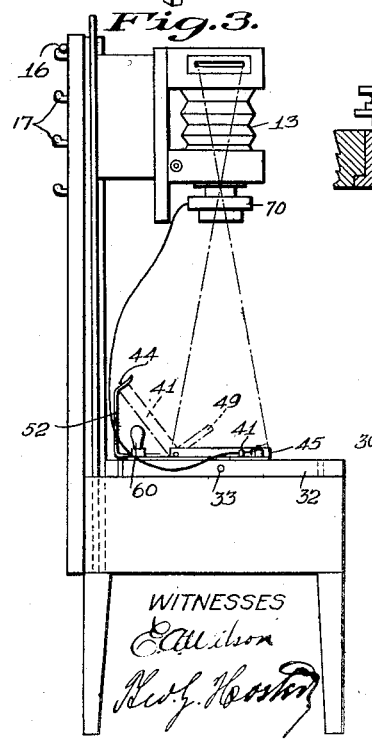
Fig.3.
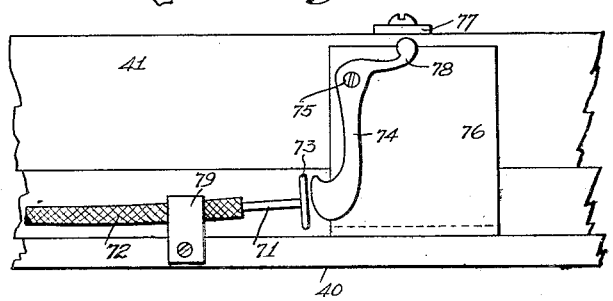
Fig.8.
Fig.9.
WITNESSES
INVENTOR
ROBERT D. GRAY
BY
ATTORNEYS July 31, 1923.  1,463,689
R. D. GRAY
PHOTO ENLARGING MACHINE
Filed March 5, 1921   2 Sheets-Sheet 2
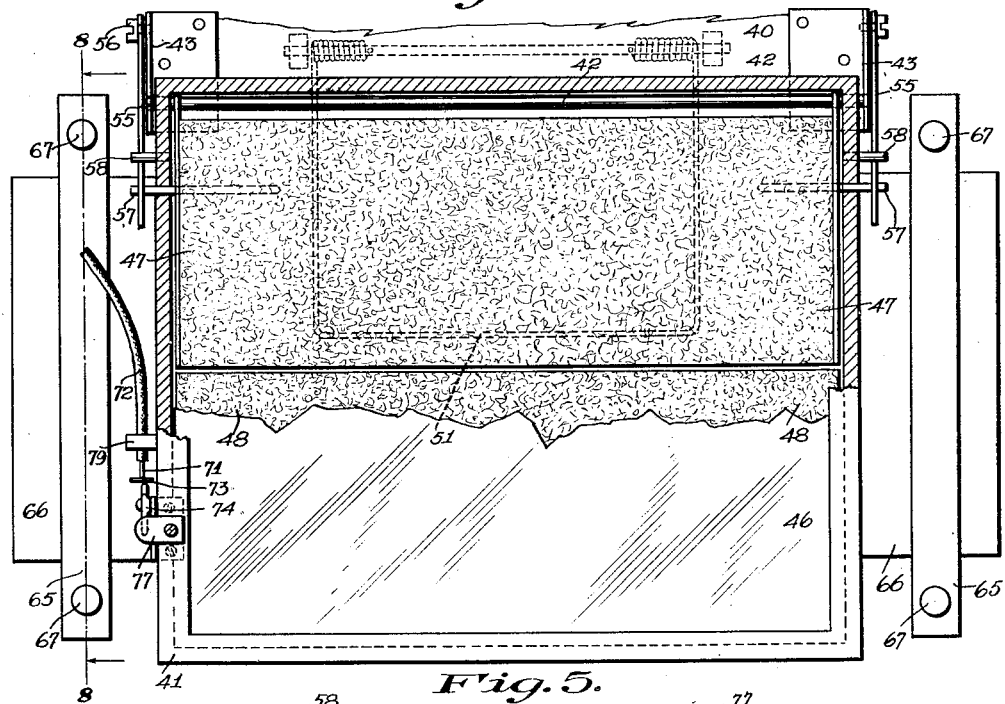
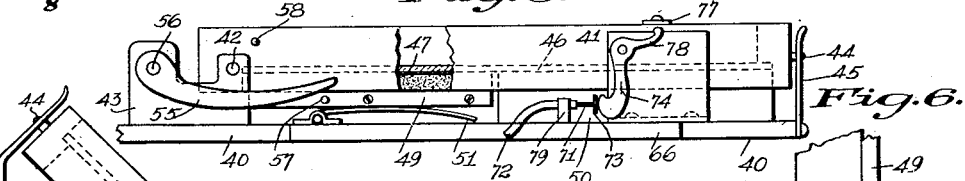
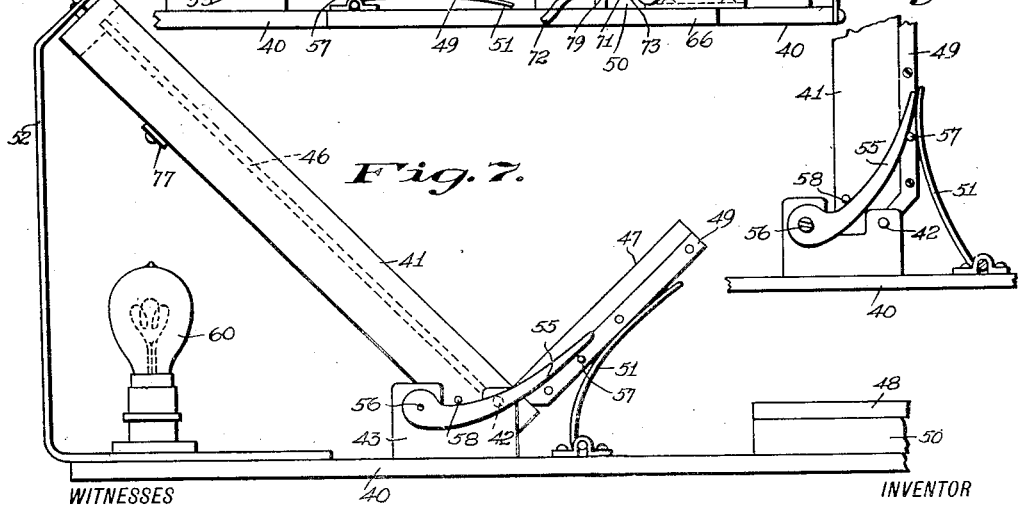
WITNESSES  INVENTOR
ROBERT D. GRAY
BY
ATTORNEYS Patented July 31, 1923.

1,463,689

UNITED STATES PATENT OFFICE.

ROBERT D. GRAY, OF NEW YORK, N. Y.

PHOTO ENLARGING MACHINE.

Application filed March 5, 1921. Serial No. 449,875.

*To all whom it may concern:*

Be it known that I, ROBERT D. GRAY, a citizen of the United States, and a resident of the city of New York, borough of Manhattan, in the county and State of New York, have invented a new and Improved Photo Enlarging Machine, of which the following is a full, clear, and exact description.

The invention relates to photography and its object is to provide a new and improved photo-enlarging machine arranged to permit an operator to make a large number of photo-enlargements in a comparatively short time.

Another object is to enable the operator seated in front of the machine to reach conveniently the various parts of the apparatus to facilitate the work.

Another object is to permit the operator to correctly and quickly position the printing paper on the printing frame and locate the latter in proper relation to an optical projector to insure good work.

With these and other objects in view, the invention consists of certain novel features of construction as hereinafter shown and described and then specifically pointed out in the claims.

A practical embodiment of the invention is represented in the accompanying drawings forming a part of this specification in which similar characters of reference indicate corresponding parts in all the views.

Figure 1 is a perspective view of the improved photo-enlarging machine with the optical projector omitted;

Figure 2 is a rear elevation of the same;

Figure 3 is a side elevation of the same with the optical projector in position;

Figure 4 is an enlarged plan view of the printing frame with parts shown in section;

Figure 5 is a side elevation of the same with parts broken out;

Figure 6 is a similar view of a portion of the same in a different position;

Figure 7 is a side elevation of the printing frame in open position for positioning the printing paper thereon;

Figure 8 is a cross section of a part of the screen board or table bed of the printing frame, the section being on the line 8—8 of Figure 4; and Figure 9 is an enlarged side elevation of the automatic tripping device for the shutter of the optical projector.

On the back 10 of a suitably constructed stand 11 is mounted to slide up and down a support 12 carrying an optical projector 13 such as an enlarging camera of usual construction, and having its optical axis preferably disposed vertically, as plainly shown in Figure 3. The support 12 is hung on balancing springs 15 attached at their lower ends to the lower ends of the support 12 at the back thereof (see Figure 2), and the upper ends of the said balancing springs 15 are fastened to a crossbar 16 adapted to be supported on sets of pins 17 located one above the other and mounted on the rear of the back 10 of the stand 11. It is understood that for optical projectors of different weights the crossbar 16 is engaged with a set of pins 17 higher up or lower down to place the springs under more or less tension to counterbalance the optical projector 13. It will be noticed that this counterbalancing arrangement for the optical projector 13 is simple and light and takes up very little space. On the front of the support 12 is mounted a rack 20 engaged by a pinion 21 mounted on a shaft 22 journaled in suitable bearings 23 attached to the front of the back 10, and on the said shaft is secured a handwheel 24 under the control of an operator seated in front of the stand to allow of raising or lowering the support 12 and with it the optical projector 13. The handwheel 24 projects into a cut-out portion 25 formed in the back 10 to allow the operator to manipulate conveniently the handwheel 24.

The stand 11 is provided with a top 30 having an opening 31 in which extends a screen board or table 32 provided at its sides with trunnions 33 journaled in the sides of the top 30 to permit of tilting the screen board from normal horizontal position into a desired angular position. The under side of the screen board 32 is provided at one or both sides with a segment 34 adapted to be engaged by a clamp 35 (see Figure 1) mounted on the stand 11 to lock the screen board in horizontal or tilted position. The screen board 32 when in horizontal position is flush with the top 30. The top of the screen board 32 supports means for holding a sheet of sensitized printing paper on which the enlargement is to be made. The printing paper holding means may be of various forms. As shown the screen board adjustably supports the bed 40 of a printing frame 41 mounted to swing at its rear end on a longitudinally extending shaft 42 held on brackets 43 attached to the bed 40. The front of the printing frame 41 is provided with a pin 44 adapted to engage a spring catch 45 held on the bed 40 to normally lock the printing frame 41 in horizontal position on the bed 40. The printing frame 41 is provided on the under side with a rabbet for receiving a sheet of printing paper or a glass plate 46, against the under side of which is pressed the sheet of printing paper by the felted tops 47 and 48 of two clamping or holding members 49 and 50, of which the clamping member 50 is fixed on the top of the bed 40 while the other clamping member 49 is mounted to swing on the shaft 42 which forms the fulcrum for the printing frame 41. The pivoted clamping member 49 is held up against the paper by a spring 51 mounted on the bed 40.

In order to accurately and quickly place the printing paper in position on the printing frame 41, the latter is swung upwardly and rearwardly into the position shown in Figure 7, and when reaching this position its pin 44 engages a spring catch 52 attached to the bed 40. During this upward and rearward swinging movement given to the printing frame 41 the pivoted clamping member 49 is held against movement after the printing frame 41 reaches and passes a vertical position (see Figures 6 and 7), and for this purpose use is made of cam arms 55, one on each side of the printing frame and pivoted at 56 on the brackets 43. Each cam arm 55 is engaged at opposite sides by pins 57 and 58, of which the pin 57 is fixed on the corresponding side of the pivoted clamping member 49 while the other pin 58 projects from the corresponding side of the printing frame 41. Thus when the printing frame 41 is swung upward until it reaches a vertical position, as shown in Figure 6, the clamping member 49 remains in closed position owing to the action of the spring 51, but on a further rearward swinging movement given to the printing frame 41 the pins 58 press against the arms 55 to swing the same downward and thus cause the arms 55 to bear against the pins 57 thereby swinging the clamping member 49 into open position relative to the printing frame 41, as shown in Figure 7. When the printing frame and its clamping member 49 are in this position the operator can place conveniently the printing paper across the under side of the printing frame 41, and when this has been done the operator by holding the paper in place and by swinging the printing frame forward finally re-engages the printing frame with the now upwardly swinging clamping member 49 to cause the latter to clamp the paper against the glass plate 46 at the time the printing frame 41 reaches a vertical position, as shown in Figure 6.

The printing frame 41 is now further swung downward to engage the paper also with the felted surface 48 of the fixed clamping member 50 on the bed 40.

In order to facilitate the positioning of the printing paper on the printing frame 41 at the time the latter is in rearmost position, as shown in Figure 7, use is made of a non-actinic lamp 60 mounted on the bed 40 near the rear end of the same. It will be noticed that the lamp 60 illuminates the printing paper to enable the operator to quickly position the same on the under side of the printing frame 41.

In order to hold the bed 40 of the printing frame 41 in any desired position on the top of the screen board 32, use is made of two transversely extending clamping bars 65 overlying the sidewise projections 66 of the bed 40, as plainly shown in Figures 4 and 8. The ends of each bar 65 are engaged by clamping screws 67 screwing into threaded sockets 68 mounted in the screen board 32 and flush with the top thereof. On loosening the clamping screws 67 the bed 40 can be readily shifted on the top of the screen board 32 in any desired direction to properly position the printing paper relative to the optical axis of the optical projector 13. When the desired adjustment has been made the clamping screws 67 are screwed down to cause the bars 65 to clamp the bed 40 in position on top of the screen frame 32.

The usual shutter mechanism 70 of the optical projector 13 is provided with the usual controlling wire 71 projecting through a sheath 72 and terminating in a button 73 adapted to be engaged by a tripping lever 74 fulcrumed at 75 on a bracket 76 attached to the bed 40 of the printing frame 41. On the printing frame 41 (see Figures 5 and 9) is secured a projecting lug 77 adapted to engage an arm 78 of the tripping lever 74 at the time the printing frame 41 swings into a closed position, thus imparting a swinging motion to the said tripping lever 74 with a view to actuate the controlling wire 71. When this takes place the shutter is opened and an exposure is made, and when this has been done the operator swings the printing frame 41 into open position thus disengaging the lug 77 from the tripping lever 74 thereby releasing the shutter and allowing the same to close. The end of the sheath 72 of the controlling wire 71 is held in a clip 79 attached to the printing frame bed 40 to insure proper movement of the wire 71 by the tripping lever 74.

From the foregoing it will be seen that by the arrangement described an operator seated in front of the photo-enlarging machine can readily swing the printing frame 41 into open position, as illustrated in Figure 7, to allow of placing the printing paper conveniently, accurately and quickly in position on the said frame particularly with the aid of the lamp 60, as previously explained. After the paper has been positioned, the printing frame 41 is swung forward and downward and the paper is then clamped in place by the clamping member 49, and when the printing frame reaches the horizontal position the printing paper is also engaged by the fixed clamping member 50. Thus the paper is firmly clamped to the under side of the glass plate 46 of the printing frame 41. When the printing frame 41 swings into closed position the tripping lever 74 is actuated to open the shutter 70 for making the exposure, and then the printing frame 41 is swung back into open position to allow the shutter to close and to permit the operator to remove the exposed printing paper from the frame 41 and place another piece of printing paper in position on the frame to repeat the above described operation. From the foregoing it will also be seen that by the arrangement described the operator is enabled to make a large number of photo-enlargements in a comparatively short time. It will be noticed that the operator seated in front of the machine can readily adjust the optical projector 13 and manipulate the printing frame as above explained.

In case it is desired to use a sheet of printing paper larger than the printing frame 41, the latter and the clamping bars 65 and the clamping screws 67 are removed to allow of supporting the printing paper on the screen board 32.

It is understood that other means besides the clamping bars 65 and clamping screws 67 may be used to clamp the printing frame 41 or other paper holding means in position on the screen board 32, the important feature being that the clamping means are removable and when removed leave the original plane unobstructed surface of the screen board intact, and that this upper surface of the screen board is flush with the surrounding top 30 of the stand 11. It is further understood that other paper holding means besides the one described and shown may be employed for holding the printing paper in a flat position on an adjustable holder under the projector without deviating from the scope of the invention.

Having thus described my invention, I claim as new and desire to secure by Letters Patent:

1. In a photo-enlarging machine, a stand provided with a vertically slidable support carrying an optical projector having its axis disposed approximately vertically, a movable printing frame on the said stand and having clamping means for clamping the printing paper in position on the printing frame, and means automatically actuating the said clamping means on moving the printing frame into operative horizontal position relative to the said optical projector and releasing the said clamping means on moving the frame into an angular position relative to the axis of the said optical projector.

2. In a photo-enlarging machine, a stand, a screen board mounted on said stand, a printing frame bed laterally adjustable on the said screen board, a printing frame mounted to swing on the said bed from normal closed position into open position for placing the printing paper in place, the said printing frame having clamping means opening and closing automatically on swinging the printing frame from closed into open position and vice versa.

3. In a photo-enlarging machine, a stand, a support mounted to slide up and down on the said stand, an optical projector attached to the said support and having its axis disposed approximately vertically, a screen board on the said stand below the said projector, a printing frame bed adjustably mounted on the said screen board, and a printing frame having its rear end pivoted on the said bed to allow of swinging the printing frame up into open position or down into closed position.

4. In a photo-enlarging machine, a stand, a support mounted to slide up and down on the said stand, an optical projector attached to the said support and having its axis disposed approximately vertically, a screen board on the said stand below the said projector, a printing frame bed mounted on the said screen board, and a printing frame having its rear end pivoted on the said bed to allow of swinging the printing frame up into open position or down into closed position, the said printing frame having clamping means for automatically clamping the printing paper in position on swinging the printing frame downward into closed position.

5. In a photo-enlarging machine, a stand, a support mounted to slide up and down on the said stand, an optical projector attached to the said support and having its axis disposed approximately vertically, a screen board on the said stand below the said projector, a printing frame bed mounted on the said screen board, a printing frame having its rear end pivoted on the said bed to allow of swinging the printing frame up into open position or down into closed position, the said printing frame having a printing paper clamping member fixed on the bed, a clamping member pivoted on the said bed, and means automatically controlling the said pivoted clamping member to cause the latter to clamp the printing paper in position on swinging the printing frame downward into closed position.

6. In a photo-enlarging machine, a printing frame bed, a printing frame mounted to swing on the said bed and provided with a pin, a clamping member pivoted on the said bed and adapted to clamp the printing paper in position on the printing frame, a pin on the said clamping member, and a cam arm fulcrumed on the said bed and engaging the said pins.

7. In a photo-enlarging machine, a screen board provided with threaded sockets flush with the top of the screen frame, a printing frame having a bed resting on the said screen frame, clamping bars engaging the said bed, and clamping screws screwing in the said sockets and engaging the said clamping bars.

8. In a photo-enlarging machine, a stand, a support slidable up or down on the said stand, an optical projector mounted on the support, springs held on the stand and connected with the said support to counterbalance the said optical projector and a transversely positioned bar adjustably mounted on the stand and secured to said springs, said bar acting to vary the tension of said springs as it is adjusted.

9. In a photo-enlarging machine, a stand, a support slidable up or down on the said stand, an optical projector mounted on the support, springs attached at their lower ends to the said support, a rod attached to the upper ends of the said springs, and sets of pins one above the other on the stand to support the said rod.

10. In a vertical type of photo-enlarging machine, a horizontal support, a printing frame mounted on said support and movable in any direction in a horizontal plane, said printing frame being also mounted for a tilting movement about a horizontal axis, and a plurality of clamping means for clamping the frame to the support.

ROBERT D. GRAY.